Figure 1:
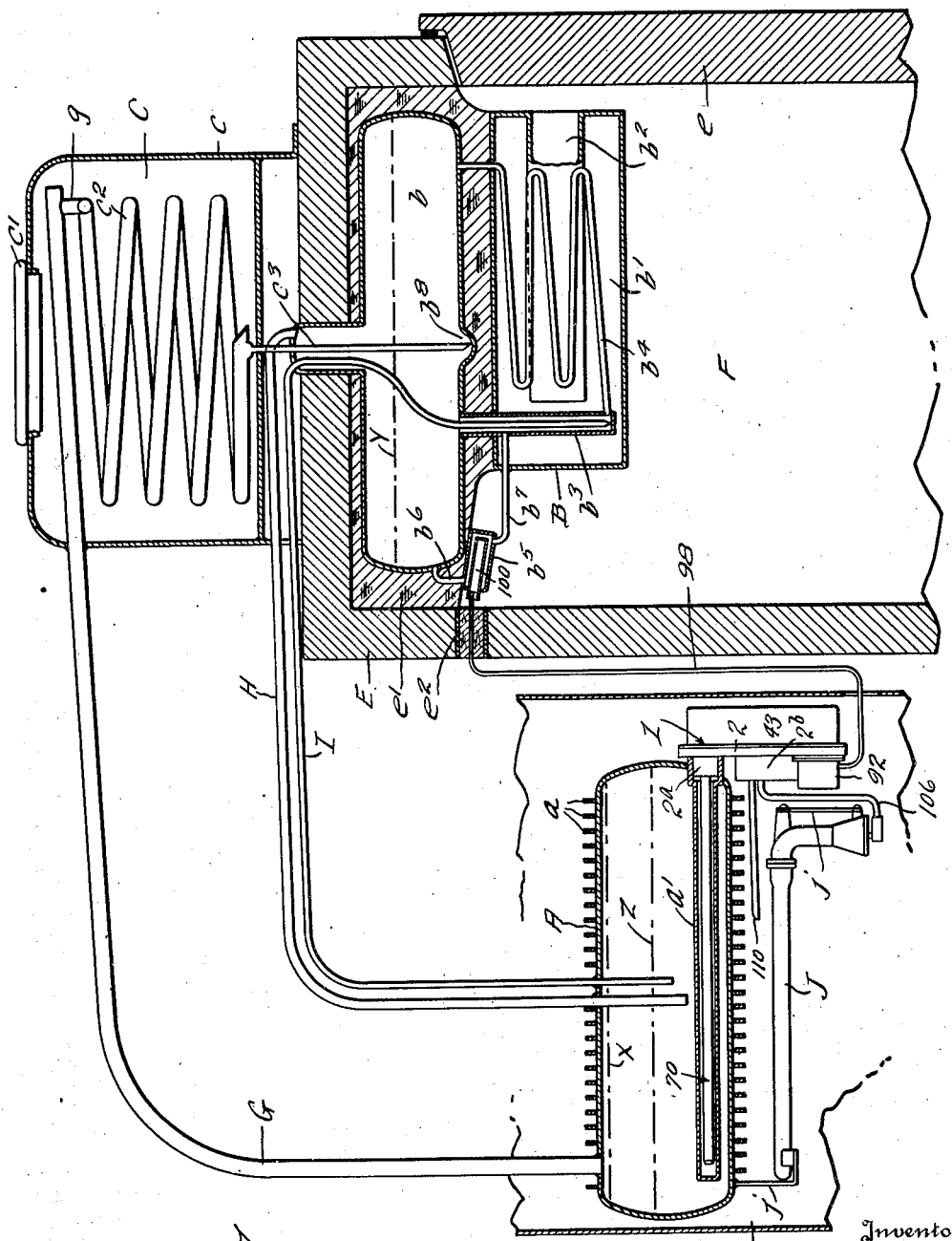

Feb. 12, 1935. L. S. CHADWICK ET AL 1,991,271
AUTOMATIC CONTROL FOR INTERMITTENT ABSORPTION REFRIGERATION APPARATUS
Filed Feb. 6, 1931 7 Sheets-Sheet 1

Inventors
Lee S. Chadwick
Marc Ricek
Wilbur G. Midnight
By Hull, Brock & West
Attorneys.

Feb. 26, 1935.   S. B. WILLIAMS   1,992,271
AUTOMATIC STOCK QUOTATION SYSTEM
Filed Sept. 17, 1931   6 Sheets-Sheet 5
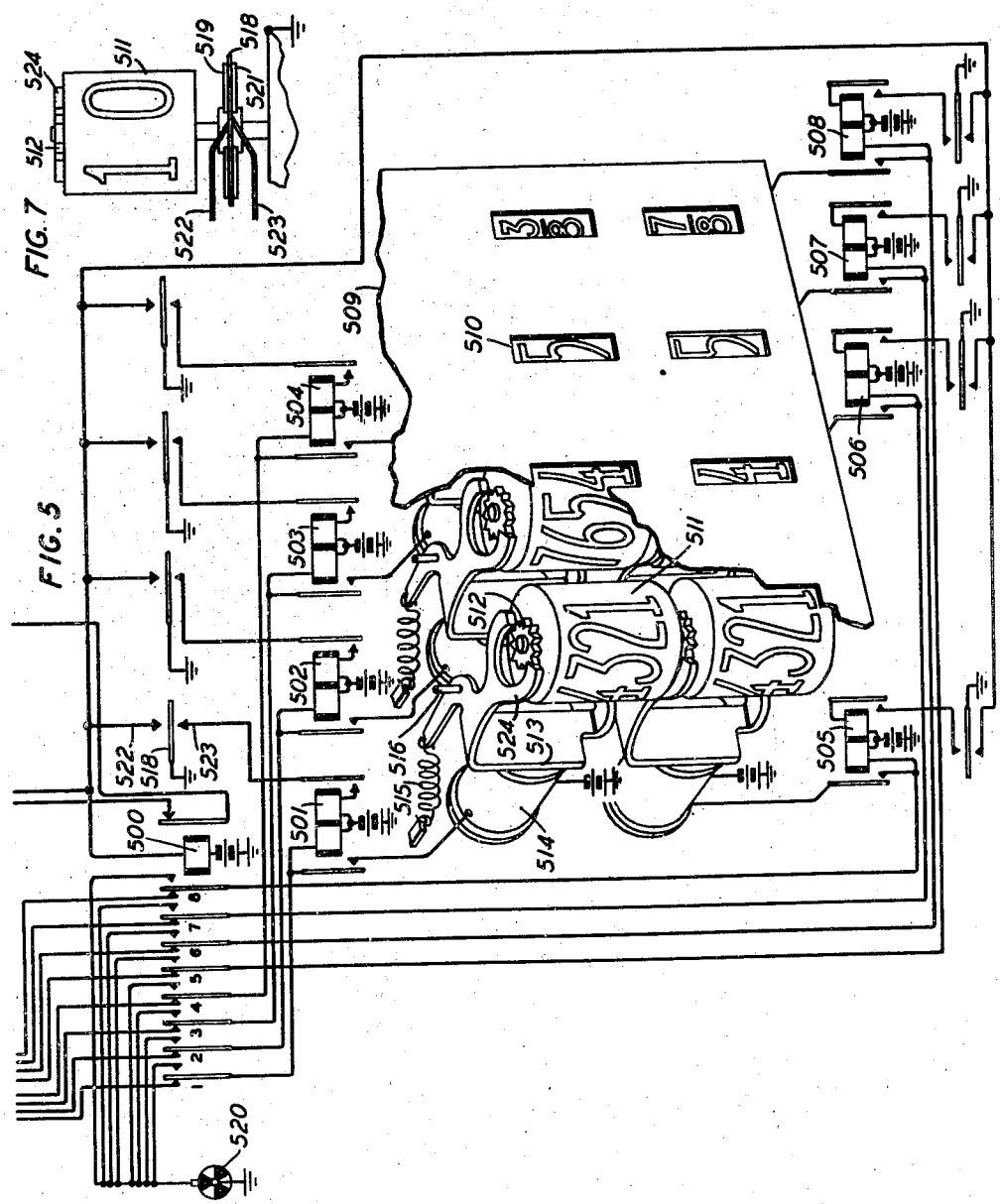
INVENTOR
S. B. WILLIAMS
BY P. C. Smith
ATTORNEY

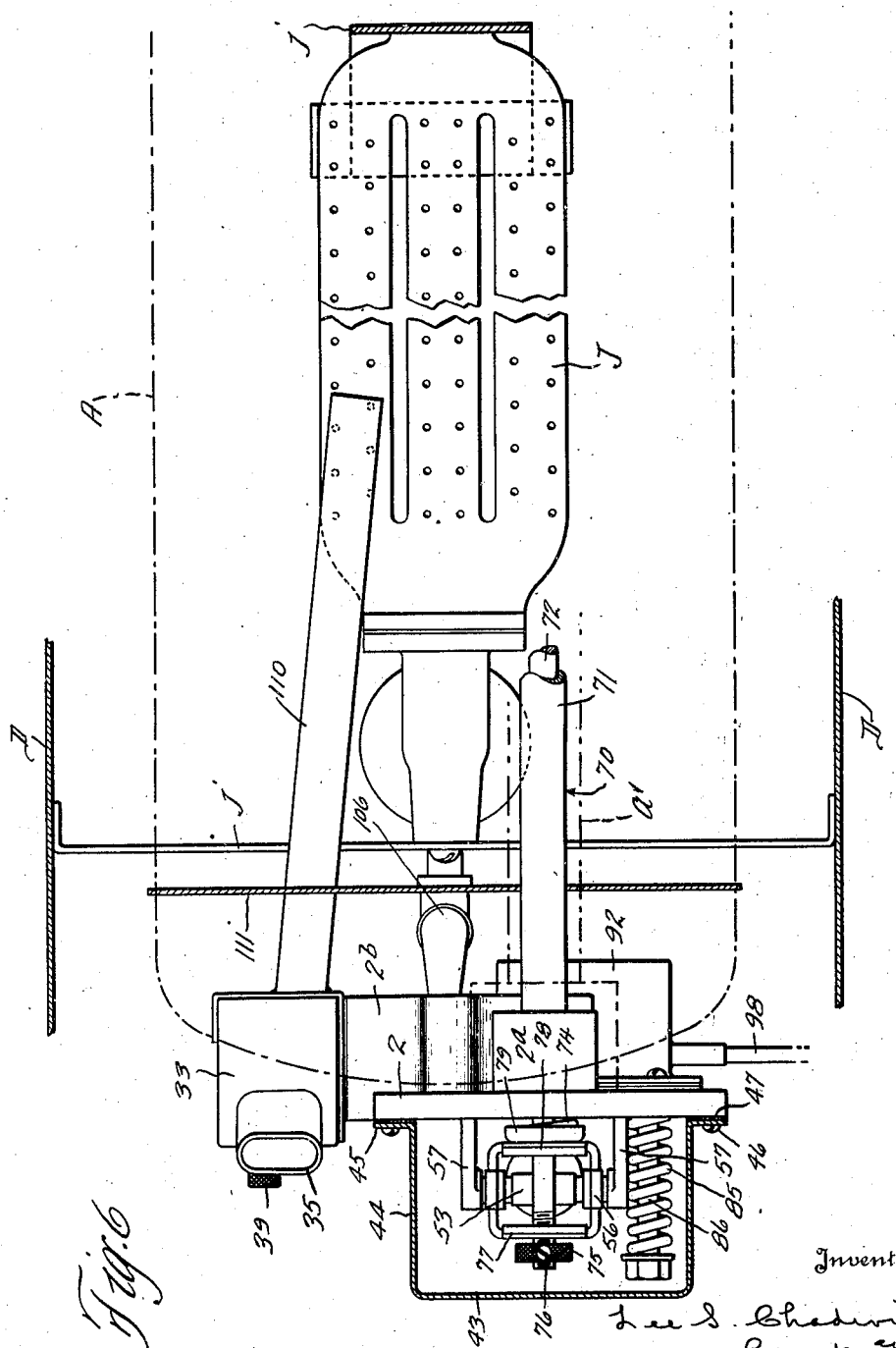

Feb. 12, 1935.  L. S. CHADWICK ET AL  1,991,271
AUTOMATIC CONTROL FOR INTERMITTENT ABSORPTION REFRIGERATION APPARATUS
Filed Feb. 6, 1931    7 Sheets-Sheet 7
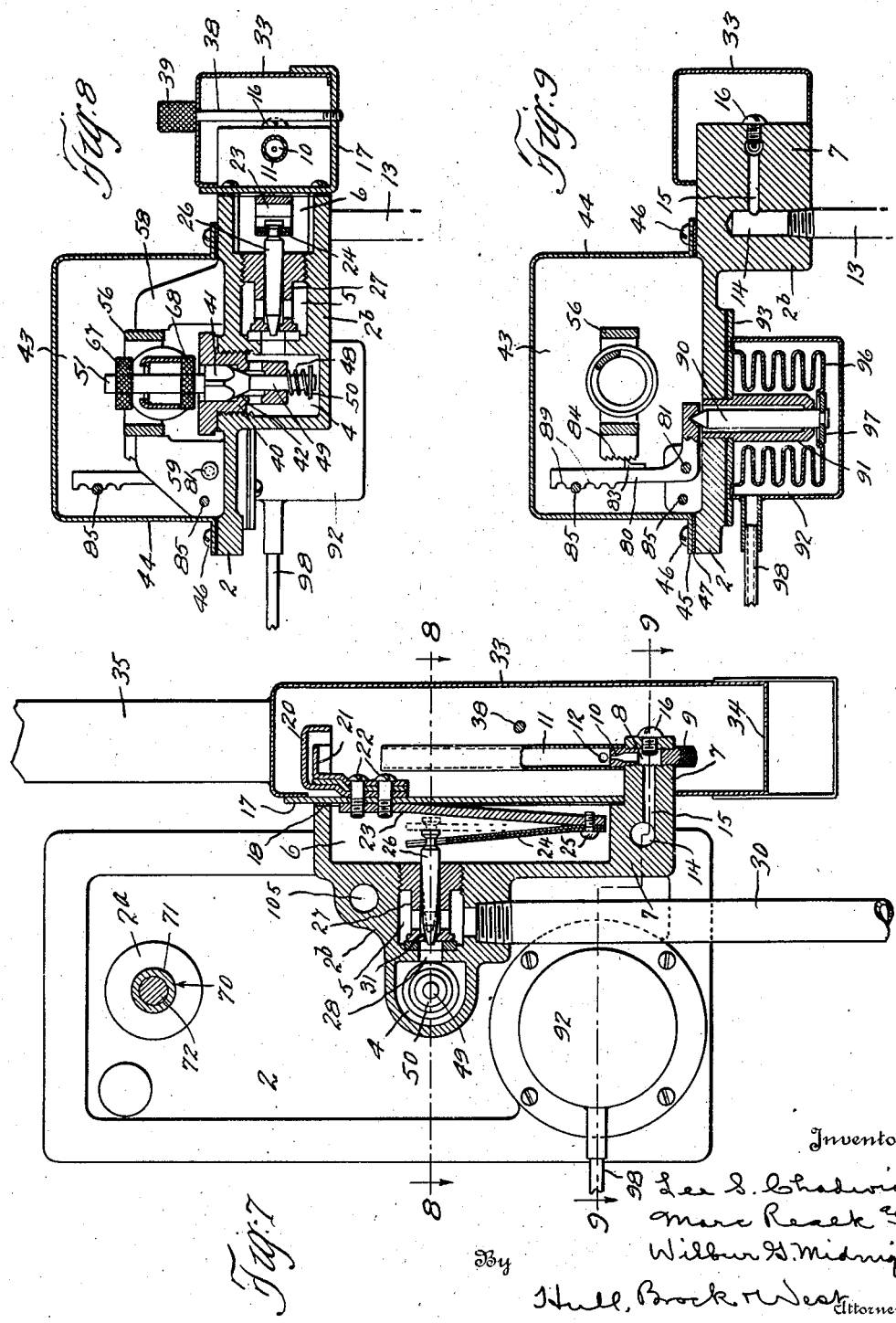

Patented Feb. 12, 1935

1,991,271

UNITED STATES PATENT OFFICE 1,991,271

AUTOMATIC CONTROL FOR INTERMITTENT ABSORPTION REFRIGERATION APPARATUS

Lee S. Chadwick, Shaker Heights Village, Marc Resek, Cleveland Heights, and Wilbur G. Midnight, Cleveland, Ohio, assignors to Perfection Stove Company, Cleveland, Ohio, a corporation of Ohio Application February 6, 1931, Serial No. 513,926

15 Claims. (Cl. 62—5)

Our invention relates to improvements in automatic controls for refrigeration apparatus of the intermittent absorption class and its primary purpose is to provide a control of this character that insures the highest efficiency from both standpoints of economical operation and satisfactory refrigeration.

By virtue of our invention, when the generator has been heated sufficiently to insure the distilling over into the evaporator of the maxium quantity of anhydrous refrigerant, the heat is automatically discontinued; and it is similarly resumed when the following combination of circumstances exists, namely: the temperature of the generator is at or below a predetermined value; the anhydrous refrigerant has been practically exhausted from the cooling unit, and the temperature of the refrigeration space is at or above a predetermined value.

These results are accomplished by the employment of two thermostats, one subjected to the temperature of the generator and acting to render the heating means ineffective when the temperature of the generator attains a predetermined high value, and tending to render said means effective when said temperature reaches a predetermined low value; and the other thermostat subjected first to the temperature of the refrigerant in the cooling unit and next to the temperature of the refrigeration space and acting under the influence of a given temperature value to permit the heating means to be rendered effective. The first thermostat is arranged in constant heat exchanging relation to the generator, and the second is shielded from the temperature of the refrigeration space by the presence of refrigerant liquid in the cooling unit.

As is well understood by those familiar with intermittent absorption refrigeration apparatus, such apparatus comprises an hermetically sealed system of inter-communicating vessels and conduits; and it is an object of our invention to provide in such system pockets or wells that are open to the exterior but closed to the interior of the system and are in intimate contact with the contents of the system, for the accommodation of the thermostatic elements. This enables said elements to be removed and inserted as occasion may require with the minimum of trouble and expense and without disturbing the refrigeration system.

Another object of the invention is to provide a comparatively simple control for refrigeration apparatus of the class referred to that is thoroughly reliable and durable and is practically immune from disorder and that is entirely automatic in that it requires no attention after the apparatus is initially set in operation.

At present we are concerned more particularly with the automatic control of gas fired refrigeration apparatus of the class in question that may be used in communities supplied with natural or artificial gas or tanked gas but wherein electricity is not available.

A further object of our invention, therefore, is to provide thermostatically actuated mechanism for turning the gas on and off in a satisfactory manner requiring, as is well known, a valve having a snap action. In other words, the gas must be turned on quickly and shut off abruptly to insure proper action of the burner, as otherwise backfiring in the mixer is liable to occur. An automatically controlled burner necessitates ignition means, such as a pilot light, and it is another object of our invention to employ a thermostat that is heated by the pilot light for maintaining a so-called safety valve, or main gas valve, open so that in case the pilot light becomes accidentally extinguished said valve will close and shut off the gas to the main burner.

Figure 2:
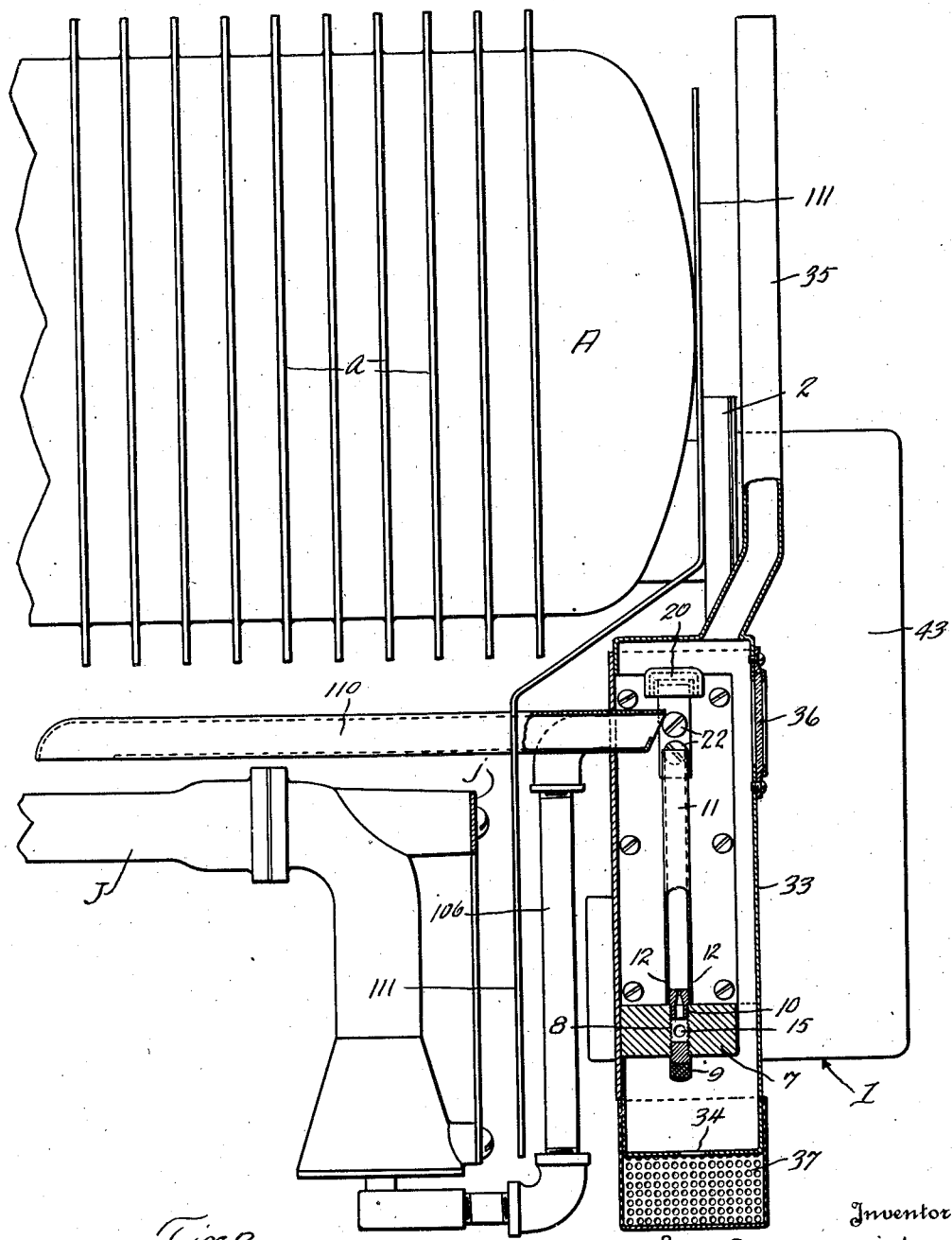
Figure 3:
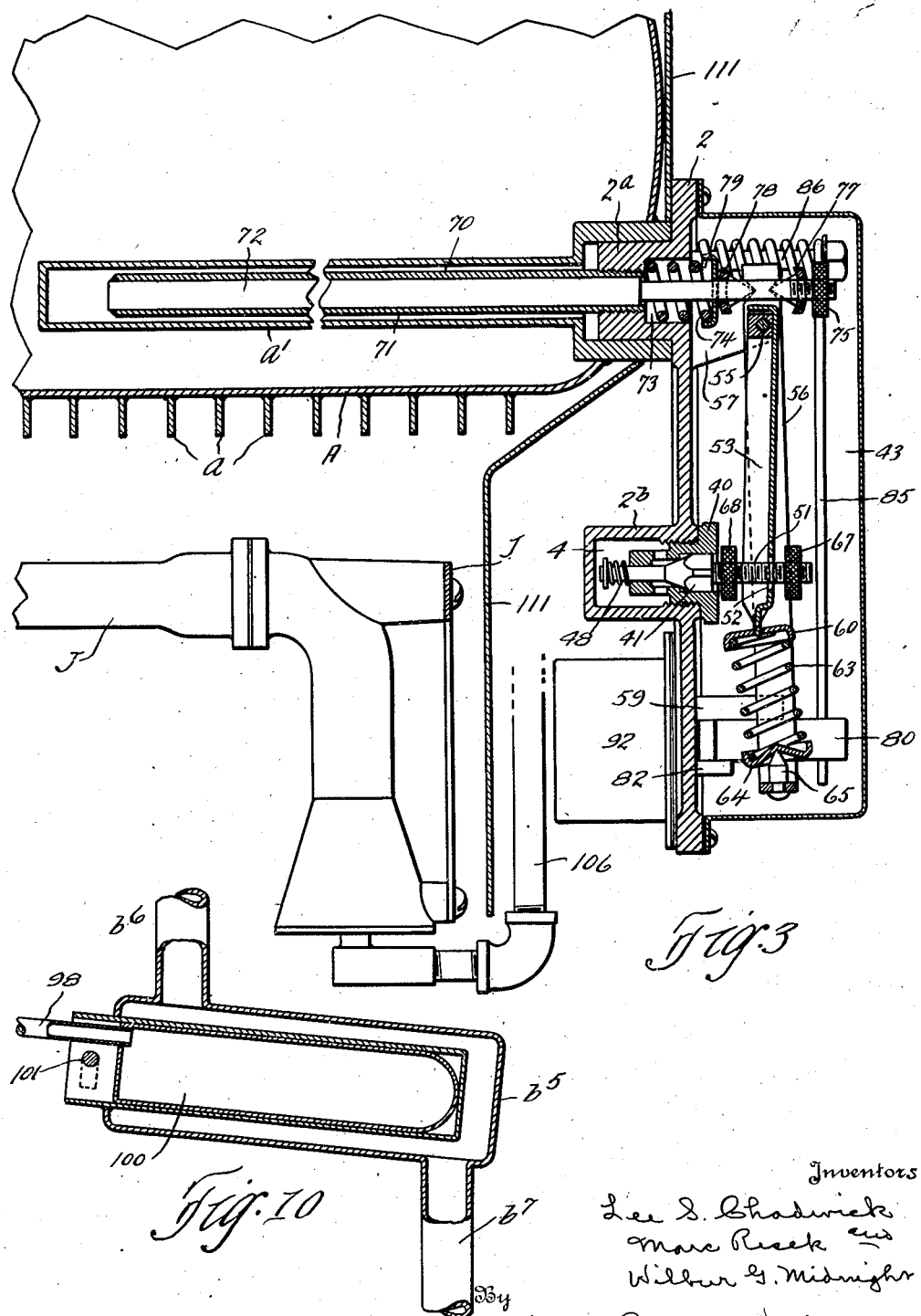
Figure 4:
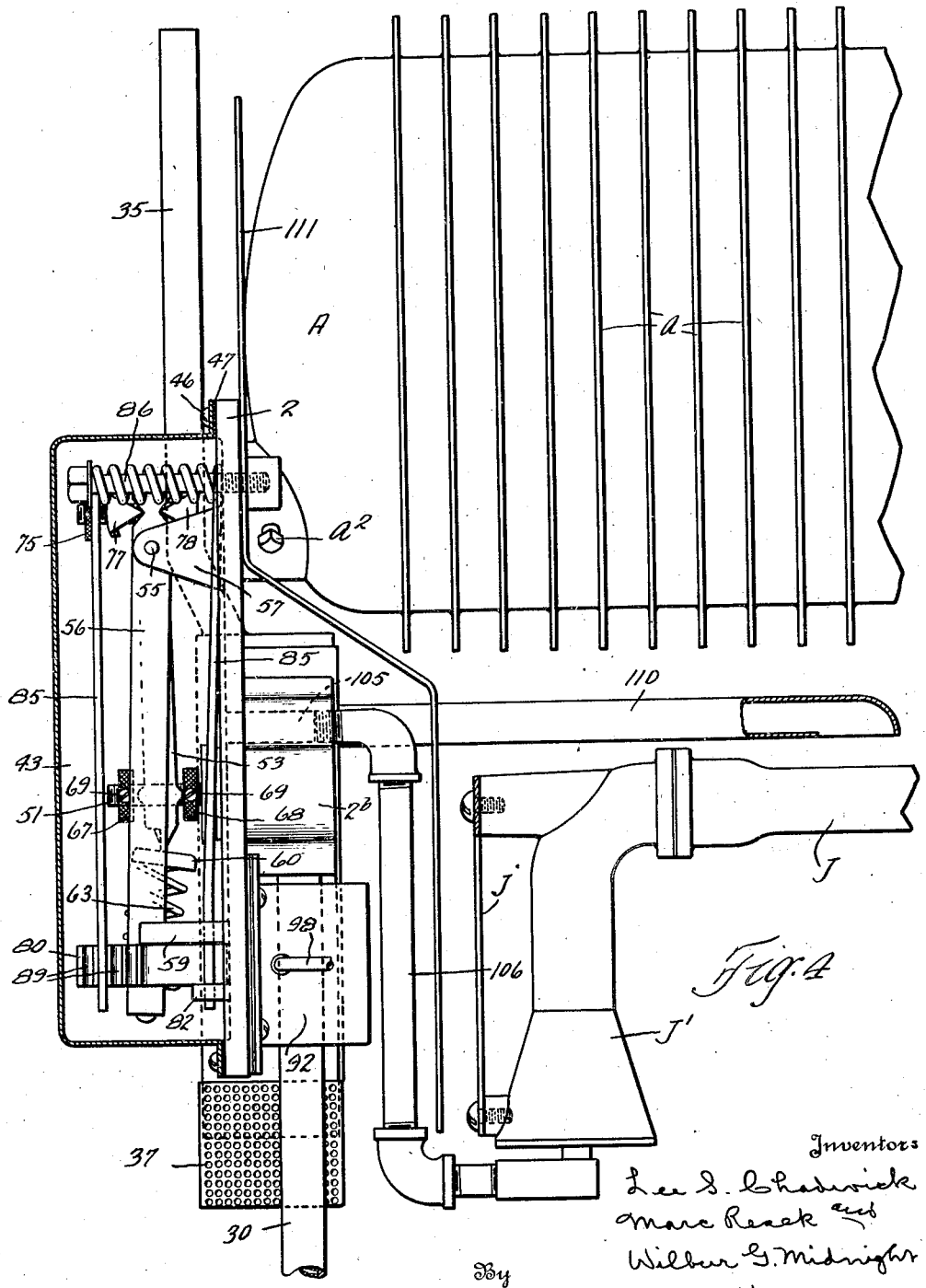

Other and more limited objects will appear as we proceed to describe the invention in detail by reference to the accompanying drawings wherein Fig. 1 is a diagrammatic representation of an intermittent absorption refrigeration apparatus embodying our invention; Fig. 2 is a fragmentary side elevation of the generator and burner equipped with our improved automatic control, the housing of the pilot light being shown in section; Fig. 3 is a vertical section through the valve operating mechanism of the control and the thermostat which actuates it, the view including parts of the generator and burner; Fig. 4 is an elevational view of the parts shown in Fig. 2 taken from the opposite side and showing the cover of the control in section; Fig. 5 is a front elevation of the control, with the cover in section, and showing the generator, and the burner with its supporting parts, beyond; Fig. 6 is a plan view of the burner and control, the cover of the control, and certain other parts, being shown in section, and the valve actuating thermostat being shown in part, while the position of the generator is indicated in dot-and-dash lines; Fig. 7 is a sectional rear elevation of the control; Figs. 8 and 9 are sections on the respective lines 8—8 and 9—9 of Fig. 7; and Fig. 10 (Sheet 3) is a sectional detail of the thermostat bulb and its receptacle that are associated with the cooling unit.

The refrigeration apparatus includes a generator A, a cooling unit designated generally by the reference character B, and a condenser similarly designated C. The generator A is located within a flue D, while the cooling unit is situated within the upper portion of an insulated cabinet E that encloses the refrigeration space F. The condenser C is shown as mounted upon the top of the cabinet E, and it consists of a vessel $c$ having a cover $c'$ and enclosing a coil $c^2$. The vessel is adapted to contain a suitable cooling medium, such as water.

The cooling unit B comprises a receiver $b$ and a brine tank $b'$ which is constructed with an inner casing that encloses a freezing space $b^2$ for the accommodation of ice trays (not shown). Said casing opens through the forward end of the tank so that it is conveniently accessible through the door $e$ of the cabinet. A tube $b^3$ depends from the bottom of the receiver $b$ into the brine tank $b'$ and terminates at its lower end near the bottom of the latter. From the lower end of the tube $b^3$ a pipe $b^4$ leads gradually upwardly and forwardly and then back and forth in intimate heat exchanging relation to the freezing space $b^2$ and thence out through the top of the brine tank near the forward end thereof and joins the bottom of the receiver $b$. The tank $b'$ permanently contains a quantity of suitable brine. A double wall receptacle $b^5$ is situated in the upper portion of the refrigeration space F, to the rear of the brine tank $b'$, and the space between the walls thereof is placed in circulation with the receiver $b$ and tube $b^3$ through the respective pipes $b^6$ and $b^7$. A jacket $e'$ of insulating material encloses the receiver, while the receptacle $b^5$ and the brine tank are exposed to the refrigeration space F. The wall of the cabinet E opposite the open end of the receptacle $b^5$ has an opening $e^2$ for the insertion and removal of a thermostatic bulb hereinafter to be described, and said opening is normally closed by insulating material.

A vapor delivery conduit G leads upwardly from the generator A and over and into the condenser C where it is connected through a drop $g$ with the upper end of the coil $c^2$. A pipe $c^3$ leads from the opposite end of said coil through the bottom of the vessel $c$ and through the top of the receiver $b$ and terminates at its lower end in a sump $b^8$ that is formed in the bottom wall of the receiver. A gas return conduit H leads from the top of the receiver $b$ over and downwardly into the generator A and terminates below the minimum liquid level therein. A return for residue liquid to the generator from the lowest point of the refrigerant space of the cooling unit is provided by a tube I which leads upwardly from the bottom of tube $b^3$ out through the top of the receiver and over and downwardly into the generator, this tube also terminating below the minimum liquid level in the generator.

The generator A is preferably equipped with fins $a$, which aid in both the heating and cooling of the vessel; and situated below the generator is a gas burner J that is supported at one end by a member $j$ that is connected to the side walls of the flue D, as shown in Figs. 5 and 6, and at the other end by a bracket $j'$ which depends from the generator A. Built into the lower portion of the generator A is a thermostat well $a'$ which is enlarged at its forward end and opens through the corresponding wall of the generator.

Our improved automatic control is in the nature of a self-contained unit designated generally by the reference character 1. This unit includes a base 2 that may consist of a casting that is formed on its rear side adjacent its upper end with a cylindrical boss 2ᵃ and, a suitable distance therebelow and to one side, with a rearwardly projecting part 2ᵇ containing valve chambers 4 and 5 (Fig. 7). A relatively large cavity 6 is formed in the side of the part 2ᵇ and below this cavity said part is provided with an offset 7. A threaded bore 8 extends vertically through the offset 7, and the lower end of said bore is closed by a screw plug 9, while a tip 10 is threaded into the upper end of said bore and contains a relatively fine orifice. Fitting down over the tip 10 is a burner tube which, for convenience, will be referred to hereinafter as the pilot light 11, the said tube having one or more air admitting openings 12 adjacent the tip 10. Gas is led from a supply pipe 13 through ports 14 and 15 to the bore 8. The port 15 is formed by drilling through the end of offset 7, and the outer end of the hole thus formed is closed by a screw 16.

The side of the part 2ᵇ through which the cavity 6 opens is finished for the application thereto of a member 17, and the joint between said member and the part 2ᵇ is sealed by a gasket 18. A cap 20, with a heat absorbing member 21 thereneath, is connected, by screws 22, with a heat conducting bar 23 through apertures in the member 17, the parts being drawn tightly together so as to render the connection through the member 17 gas tight. A bimetallic strip 24, constituting a thermostat, is fastened, as by a screw 25, to the lower end of the heat conducting bar 23 and, at its upper end, said strip is bifurcated to receive the neck of a valve member 26. The valve member reciprocates within the bore of a valve casing 27 that is threaded into the chamber 5. The chambers 4 and 5 communicate through a passageway 28 wherewith the bore of the valve casing 27 registers. Gas is led from a suitable source to the chamber 5 through a supply pipe 30. When the bimetallic strip 24 is cold, it occupies the position shown in full lines in Fig. 7, in which position it maintains the valve member 26 against the seat 31 of the valve casing, but when heat from the pilot light is communicated through the member 21, screws 22 and bar 23 to the bimetallic strip 24, said strip warps to the position indicated in dotted lines in Fig. 7, thereby to withdraw the valve from its seat and open up communication between the chambers 5 and 4. It follows that as long as the pilot light is burning the valve will be held open, but upon said light being extinguished, the valve will be forced against its seat to shut off communication between the valve chambers.

As is apparent particularly from Figs. 6 and 8, the member 17 is L-shaped in cross section, and a casing 33 is removably secured thereto by a screw 38. This casing encloses the pilot light and protects it from disturbing drafts, and air is supplied to its interior through an opening 34 in the bottom thereof, while the products of combustion escape from the casing through a chimney 35 that rises from its top wall. The front wall of the casing 33 has a sight opening through which the pilot light may be observed and the same is closed by a pane 36 of glass or other suitable transparent material. A perforated cap 37 is applied to the lower end of the casing 33 to prevent the entrance of dirt through the opening 34.

As best shown in Figs. 3 and 8, the valve chamber 4 opens through the front of the base 2 and is internally threaded adjacent its forward end for cooperation with the threaded portion of a valve casing 40 that occupies said chamber. Reciprocably mounted within this casing 40 is a valve member 41 having a tapered portion for engagement with the seat 42 of said casing. When the valve member is off said seat, gas may flow from the chamber 4 through the bore of the casing into the space designated 43 enclosed by a cover 44. This cover is in the nature of a rectangular box whose open side is surrounded by a flange 45, and said flange is adapted to be secured, by screws 46, to the edge portion of the base 2, with a gasket 47 sealing the joint between the cover and base, the space 43 thus being rendered gas tight. Communication between the chamber 4 and the space 43 is shut off when the valve member 41 is in engagement with the seat 42. Assisting, under certain conditions, in holding the valve against said seat is a spring 48 that surrounds the rear end of the stem 49 of the valve member and is confined between an abutment 50 that is carried by the end of said stem and the adjacent end of the casing 40.

A threaded stem 51 projects forwardly from the valve member 41 through an opening 52 in the web of a channel like toggle arm 53 that is pivoted adjacent its upper end on a pin 55. This pin serves also to pivotally support a toggle frame 56 between brackets 57 that project forwardly from the base 2. As will be seen from Fig. 5, the toggle frame 56 is U-shaped, and its lower end is guided between arms 58 and 59 (Figs. 5 and 8) that extend forwardly from the base 2. Rockingly engaging the lower end of the toggle arm 53 is a spring seat 60, said seat having a central hole through which a protuberance 61 on the lower end of the rearwardly offset portion of the web of said channel-like toggle arm extends while the side flanges of said arm are made pointed and have knife-edge bearing on diametrically opposed portions of said spring seat. A coil spring 63 is compressed between the spring seat 61 and a spring seat 64 whose central portion is conical and bears upon a pointed pin 65 that is carried by the central branch of the U-shaped toggle frame 56. Knurled nuts 67 and 68 are threaded on the stem 51 and are adapted to be engaged, respectively, by the front and rear sides of the toggle arm 53 when said arm is swung forwardly and rearwardly in a manner presently to be described. The nuts are adjustable along the stem 51 and are adapted to be locked in any position to which they are adjusted by set screws 69.

The toggle frame 56 is adapted to be swung on the pivot pin 55 by a thermostat designated generally by the reference character 70 and consisting of a tube 71 whose forward end is threaded within an axial bore of the boss 2ª and a rod 72 enclosed by said tube and fastened thereto at its rear end, the rod being moved longitudinally by the expansion and contraction of the tube. While various metals having different coefficients of expansion may be used for the thermostatic couple, we have found that a tube of brass and a rod of invar metal are very satisfactory. The boss 2ª is counterbored through the front surface of the base 2 to provide a cavity 73 for the accommodation of a coil spring 74; and where the rod 72 projects beyond the forward end of the tube 71 it is reduced in diameter and extends a material distance beyond the upper end of the toggle frame 56, the forward end of the rod being threaded for the application of a knurled nut 75 that is adapted to be locked in any position to which it is adjusted by a set screw 76.

Apertured members 77 and 78 are applied to the reduced end of the rod 72, forwardly and rearwardly of the toggle frame, and at their ends have knife edge bearings which are engaged within V notches formed in the respective edges of the side members of said frame in substantially the transverse plane of the axis of the rod, all of which is clearly apparent from Figs. 3 and 5. A spring retainer 79 is interposed between the forward end of the spring 74 and the knife edge bearing member 78.

The manner in which the valve 41 is actuated by the thermostat 70 will be apparent from the foregoing construction. As shown in the drawings, the valve is closed, in which condition it was placed by the heating of the thermostat to a predetermined high degree. Assuming now that the temperature affecting the thermostat 70 drops, the tube 71 will contract and shorten, and will move the rod 72 forwardly. When so moved, the spring 74 will expand, if permitted to do so by the release of a latch hereinafter to be described, and will shift the knife edge bearing members 77 and 78 forwardly and, through the intervention of the latter bearing member and the spring retainer 79, swing the upper end of the toggle frame 56 forwardly and the lower end rearwardly between the guide arms 58 and 59. When the frame has moved sufficiently to swing the pointed pin 65 beyond the plane of alignment of the pivot pin 55 and the point of contact between the lower end of the toggle arm 53 and the spring seat 60, and during which time the spring 63 is compressed to the maximum, said spring will instantly recoil and snap the lower end of the toggle arm 53 outwardly engaging it with the nut 67 and withdrawing the valve 41 from its seat in opposition to the relatively light resistance of the spring 48. This will result in establishing communication between the chamber 4 and the space 43 so as to permit gas to flow into said space.

The above described action and the opening of the valve, however, are under the control of a latch which will now be described. In case this latch is in holding condition when the thermostat 70 cools, the spring 74 will remain compressed with power stored therein to operate the toggle mechanism when said latch is released. The latch consists of a bell crank 80 (Figs. 9) that is pivotally supported on a pin 81 between the arm 79 and a bracket 82 that is spaced therebelow. The forwardly extending branch of the bell crank 80 carries a projection 83 that cooperates with a ratchet 84 on the side of the toggle frame 56, and a spring 85 urges the bell crank in a direction to engage said projection with the teeth of the ratchet. This spring is coiled about a post 86 that projects forwardly from the upper end of the base 2 and one of its ends is projected downwardly through holes in the arm 59 and the bracket 82 while its opposite end is adapted to be engaged with any one of a series of notches 89 in the forwardly extending branch of the bell crank 80. By the adjustment thus provided, the effect of the spring on the bell crank may be varied. The rear face of the laterally extending branch of said bell crank has a conical depression within which bears the pointed end of a pin 90 that is guided at its rear end within an aperture of a thimble 91 whose forward end projects through a hole in the base 2. This thimble is centrally disposed within a cylindrical casing 92 that is carried by a circular plate 93 which is suitably secured to a finished surface on the rear side of the base with a gasket 94 interposed between it and said base. A diaphragm or bellows 96 is enclosed by the casing 92 and its forward end is suitably connected with a leak proof joint to the plate 93, while its rear end incorporates a washer 97 to which the rear end of the pin 90 is fastened, the joint between the washer and diaphragm or bellows being fluid tight. The interior of the casing 92, or, more accurately speaking, the space between it and the diaphragm or bellows 96, communicates, through a tube 98, with a bulb 100 (Figs. 1 and 10) that is enclosed within the double wall receptacle $b^5$ in the refrigeration space F. The bulb, tube and casing contain a thermo-sensitive fluid which, when expanded, contracts the diaphragm or bellows 96 and urges the pin forwardly thereby to rock the bell crank 80 on the pivot pin 81 against the tension of spring 85 and withdraw the projection 83 from the ratchet 84. When the toggle frame is released in this manner, the spring 74 is permitted to expand and swing said frame as above described. Thus it will be seen that the opening of valve 41 is under the control of the thermostat that is subjected to the temperatures of liquid refrigerant in the cooling unit and of the refrigeration space. A subsequent heating up of the thermostat 70 will result in a reversal of the above described action of the toggle mechanism and the closing of the valve, the movement of the rod 72 being transmitted to the toggle frame 56 through the nut 75 and knife edge bearing members 77.

The bulb 100 is removable from the receptacle $b^5$, but is held against withdrawal by a pin 101 which is extended through the projecting forward end of the inner wall of said receptacle.

A port 105 (Figs. 4, 5 and 7) extends through the part $2^b$ of the base 2, and leading from said port to the mixer $j'$ of the burner J is a pipe 106. Gas is thus conducted from the space 43 through the port 105 and pipe 106 to the burner J.

A gas communicator tube 110 (Figs. 1, 2, 4 and 6) leads from the pilot light to a point above one branch of the burner J, and when the valve 41 is opened and gas is thus permitted to flow to the burner, a part of the gas issuing from the burner will be communicated through the tube 110 to the pilot light and thereby be ignited to flash back and light the burner.

Attention is directed to the fact that the control is solely supported by the boss $2^a$ that is engaged within the enlarged forward end of the thermostat well $a'$, and it is locked therein by a set screw $a^2$ (Fig. 4). To remove the control, it is only necessary to disconnect the gas pipes, and loosen the set screw $2^a$, and withdraw the thermostat 70 from the well $a'$ and the thermostat bulb 100 from the receptacle $b^5$ through the opening $e^2$ in the cabinet wall.

To protect the control from the heat of the burner, we provide a shield 111 which is carried by the base 2 and extends upwardly in front of the generator and downwardly and rearwardly between the control and the burner.

In considering the operation of the apparatus, it will be assumed that the pilot light is burning, and that the liquor—a mixture of a suitable refrigerant, such as ammonia, and an absorbent therefor, such as water, in proper proportions—is present in the generator to the maximum level indicated by the line $x$ in Fig. 1. Under these conditions, the cooling unit is exhausted of refrigerant liquid and the space between the walls of the receptacle $b^5$ is empty. Consequently the thermostatic bulb 100 is subjected to the temperature of the refrigeration space F, and when said temperature is sufficiently high, it will expand the fluid in said bulb to compress the diaphragm or bellows 96 and, through the intervention of the pin 90, rock the bell crank 80 in a direction to unlatch the toggle frame 56. Thus released, said frame will be swung inwardly at its lower end under the action of the spring 74, and as a result of this movement of the toggle frame, the spring 60 will snap the lower end of the toggle arm 53 outwardly, as hereinbefore described, and thereupon gas will be supplied to the main burner and said burner will be ignited by the pilot light in the manner already explained.

With the main burner now in operation, the generator will be heated, and the refrigerant vapors will be driven off through the conduit G, the greater part of the absorbent vapors condensing in the upper inclined portion of said conduit (which acts as a dehydrator) and returning therefrom by gravity to the generator. The refrigerant vapors will pass on through the condenser and be condensed within the coil 62 and gravitate therefrom through the pipe $c^3$ to the receiver $b$. This will continue until the level of anhydrous refrigerant in the cooling unit will stand at approximately the elevation indicated by the dotted line $y$.

By the time this occurs, the liquid level in the generator will have dropped to about that indicated by the dotted line $z$, and the heat of the generator will be such as to expand and elongate the tube 71 of the thermostat 70 and this will actuate the control to close the valve 41 in the manner hereinbefore described and thus shut off the supply of gas to the main burner J. In the meantime, the thermostatic bulb 100 has been cooled by the presence of liquid refrigerant within the space between the walls of the receptacle $b^5$, and the consequential contraction of the fluid in the bulb will permit the diaphragm or bellows 96 to expand and retract the pin 90 so as to allow the spring 85 to swing the bell crank 80 in a direction to engage the projection 83 with the ratchet 84 on the toggle frame 56.

With the main burner shut off, the pressure within the system will drop and the anhydrous refrigerant in the cooling unit will start to evaporate and will flow back through the gas return conduit H and be reabsorbed by the relatively weak liquor in the generator A. During this process of absorption the generator will gradually cool and the thermostat 70 will reverse its former action and again tend to open the valve 41 by swinging inwardly the lower end of the toggle frame 56. This action is obstructed by the latch including the bell crank 80, and said latch will remain effective to prevent the opening of the valve until a sufficiently high temperature is communicated to the thermostatic bulb 100 to expand the fluid therein and, in the manner already described, release said latch. This will not occur as long as there is refrigerant liquid present in the space between the walls of the receptacle $5^b$. Furthermore, it will not occur even after said fluid has been exhausted from said space if the temperature of the refrigeration space F is sufficiently low to prevent such expansion. When the temperature of said space rises, however, above a predetermined degree,—35° F. for example—said fluid will expand and the latch will be released as a consequence thereof and the valve 41 will be opened and the main burner again set in operation to repeat the cycle above described.

For brevity and convenience, in certain of the claims, the toggle mechanism for opening and closing the valve 41 will be termed "snap action"; and by reason of its function, the spring 74 will be referred to as "power storage means".

Having thus described our invention, what we claim is:

1. In combination with intermittent absorption refrigeration apparatus; heating means for the generator thereof, a device movable to alternately render the heating means effective and ineffective, power storage means for moving said device for one of said purposes, a thermostat subjected to the temperature of the generator for storing power in said power storage means and for moving said device for the other of the aforesaid purposes, and a thermo-sensitive element exposed to the temperature of a part of said apparatus for subjecting said device to the action of the power storage means whenever said temperature to which it is exposed is above a predetermined value.

2. In combination with intermittent absorption refrigeration apparatus; heating means for the generator, a device movable to alternately render the heating means effective and ineffective, power storage means for moving said device for one of said purposes, a thermostat subjected to the temperature of the generator for storing power in said power storage means and for moving the aforesaid device for the other of said purposes, means restraining said device against movement by the power storage means, and a thermo-sensitive element subjected to the temperature of a part of the apparatus for rendering the restraining means ineffective thereby to immediately release said device to the action of the power storage means whenever the temperature of said part of the apparatus is above a predetermined value.

3. In combination with intermittent absorption refrigeration apparatus; heating means for the generator thereof, a device movable to render the heating means effective or ineffective, a thermostat subjected to the temperature of the generator, power storage means, said thermostat acting to move the aforesaid device and to store power within said power storage means, means restraining the power storage means from acting, the power storage means when released serving to move the aforesaid device, and a thermo-sensitive element subjected to the temperature of a part of the apparatus and serving whenever said temperature is above a predetermined value to render the restraining means ineffective thereby to immediately release said device to the action of the power storage means.

4. In combination with the generator, cooling unit and refrigeration space of intermittent absorption refrigeration apparatus; heating means for the generator, a thermostat subjected to the temperature of the generator for rendering the heating means ineffective when said temperature attains a predetermined high value, and a second thermostat in heat exchanging relation to the refrigeration space and adapted to be shielded therefrom by liquid refrigerant in the cooling unit and active under the influence of a temperature value above a desired refrigerating temperature in rendering the heating means effective whereby the apparatus is caused to operate entirely automatically.

5. In combination with intermittent absorption refrigeration apparatus; heating means for the generator, a device movable in one direction to render the heating means effective and in a second direction to render said means ineffective, a thermostat subjected to the temperature of the generator, power storage means associated therewith, the thermostat acting under a relatively high temperature to move the aforesaid device in the second direction and to store power within said power storage means, means restraining the power storage means from acting, the power storage means when released serving to move the aforesaid device in the first mentioned direction, and a thermo-sensitive element subjected to the temperature of a part of the apparatus and serving whenever said temperature is above a predetermined value to render the restraining means ineffective thereby to immediately release said device to the action of the power storage means.

6. In combination with a generator, cooling unit and refrigeration space of intermittent absorption refrigeration apparatus, the cooling unit including a receiver insulated from said space and a diffusing element communicating with the receiver and arranged in heat exchanging relation to the refrigeration space; heating means for the generator, a device movable in one direction to render the heating means effective and in a second direction to render said means ineffective, a thermostat subjected to the temperature of the generator, power storage means associated therewith, the thermostat acting under a relatively high temperature to move the aforesaid device in the second direction and to store power within said power storage means, means restraining the power storage means from acting, the power storage means when released serving to move the aforesaid device in the first mentioned direction, a second thermostat in heat exchanging relation to the refrigeration space and insulated from the receiver, the same acting under a given temperature value to actuate the restraining means thereby to cause it to release the power storage means, and means in communication with the cooling unit arranged to shield the second thermostat from the temperature of the refrigeration space when containing liquid from said unit.

7. In combination with the generator, cooling unit, and refrigeration space of intermittent absorption refrigeration apparatus; heating means for the generator, a "snap action" movable in one direction to render the heating means effective and in a second direction to render said means ineffective, power storage means for moving said "snap action" in the first direction, a thermostat subjected to the temperature of the generator and acting under a relatively high temperature to move the "snap action" in the second direction and to store power in said power storage means, means restraining the power storage means from acting, and a second thermostat subjected to the temperature of the refrigeration space and acting under a given temperature value to render the restraining means ineffective.

8. In combination with the generator, cooling unit, and refrigeration space of intermittent absorption refrigeration apparatus, the cooling unit including a receiver insulated from said space and a diffusing element communicating with the receiver and arranged in heat exchanging relation to the refrigeration space; heating means for the generator, a device movable in one direction for rendering the heating means effective and in a second direction for rendering the heating means ineffective, power storage means for moving said member in the first direction, a thermostat subjected to the temperature of the generator and acting under a relatively high temperature for moving the aforesaid device in the second direction and for storing power in the power storage means, a latch restraining the device from moving in the second direction, a second thermostat in heat exchanging relation to the refrigeration space and insulated from the receiver, the same acting under a given temperature value to release the latch, and means in communication with the cooling unit arranged to shield the second thermostat from the temperature of the refrigeration space when containing liquid from said unit.

9. In combination with the generator, cooling unit and refrigeration space of intermittent absorption refrigeration apparatus, the cooling unit including a receiver insulated from said space and a diffusing element communicating with the receiver and arranged in heat exchanging relation to the refrigeration space; a gas burner for heating the generator, a valve for controlling the flow of gas to said burner, said valve being movable in one direction to increase the supply of gas to the burner and in a second direction to decrease the supply of gas thereto, power storage means for moving the valve in the first direction, a thermostat subjected to the temperature of the generator and acting under a relatively high temperature to move the valve in the second direction and to store power in said power storage means, means restraining the power storage means from acting, a second thermostat in heat exchanging relation to the refrigeration space and insulated from the receiver, the same acting under a given temperature value to render the restraining means ineffective, and means in communication with the cooling unit arranged to shield the second thermostat from the temperature of the refrigeration space when containing liquid from said unit.

10. In combination with the generator, cooling unit and refrigeration space of intermittent absorption refrigeration apparatus; a gas burner for heating the generator, a valve for controlling the supply of gas to the burner, a "snap action" movable in one direction to open the valve and in a second direction to close the valve, power storage means for moving said "snap action" in the first direction, a thermostat subjected to the temperature of the generator and acting under a relatively high temperature to move the "snap action" in the second direction and to store power in the power storage means, a latch for restraining the "snap action" from moving in the first direction, a thermostat subjected to the temperature of liquid refrigerant in the cooling unit and to the temperature of the refrigeration space and acting under a given temperature value to release the latch, and igniting means for the burner.

11. In combination with intermittent absorption refrigeration apparatus; a gas burner for heating the generator thereof, a valve controlling the supply of gas to the burner, a device shiftable to alternately move the valve toward open and closed positions, a thermostat subjected to the temperature of the generator, power storage means, the thermostat acting to shift the aforesaid device and to store power within said power storage means, means restraining the power storage means from acting, the power storage means when released serving to shift the aforesaid device, and a thermo-sensitive element subjected to the temperature of a part of the apparatus and serving whenever said temperature is above a predetermined value to render the restraining means ineffective thereby to immediately release said device to the action of the power storage means.

12. In combination with the generator, cooling unit, and refrigeration space of intermittent absorption refrigeration apparatus, the cooling unit including a receiver insulated from said space and a diffusing element communicating with the receiver and arranged in heat exchanging relation to the refrigeration space; heating means for the generator, a thermostat subjected to the temperature of the generator for rendering the heating means ineffective when said temperature attains a predetermined high value, a pressure actuated device operable in rendering the heating means effective, thermo-sensitive pressure creating means communicating therewith and being in heat exchanging relation to the refrigeration space and insulated from the receiver, the same functioning to create pressure for operating the aforesaid device under a given temperature value, and a receptacle in communication with the cooling unit and arranged to shield the pressure creating means from the temperature of the refrigeration space when said receptacle contains liquid refrigerant in appreciable quantity.

13. In combination with the generator, cooling unit, and refrigeration space of intermittent absorption refrigeration apparatus, the cooling unit including a receiver insulated from said space and a diffusing element communicating with the receiver and arranged in heat exchanging relation to the refrigeration space; heating means for the generator, a thermostat subjected to the temperature of the generator for rendering the heating means ineffective when said temperature attains a predetermined high value and tending to render said means effective when said temperature reaches a predetermined low value, a pressure actuated device operable to permit the heating means to be rendered effective, thermo-sensitive pressure creating means communicating with said device and being in heat exchanging relation to the refrigeration space and insulated from the receiver, the same functioning to create pressure for operating the aforesaid device under the influence of a given temperature value, and a receptacle in communication with the cooling unit and arranged to shield the pressure creating means from the temperature of the refrigeration space when said receptacle contains liquid refrigerant in appreciable quantity.

14. In combination with the generator, cooling unit and refrigeration space of intermittent absorption refrigeration apparatus, the cooling unit including a receiver insulated from said space and a diffusing element communicating with the receiver and arranged in heat exchanging relation to the refrigeration space; heating means for the generator, a thermostat subjected to the temperature of the generator for rendering the heating means ineffective when said temperature attains a predetermined high value, a pressure actuated device operable to permit the heating means to be rendered effective, thermo-sensitive pressure creating means in heat exchanging relation to the refrigeration space and insulated from the receiver, said pressure creating means communicating with said pressure actuated device and functioning under the influence of a given temperature value to create pressure to actuate said device, and a receptacle in communication with the cooling unit and arranged to shield the pressure creating means from the temperature of the refrigeration space when said receptacle contains liquid refrigerant in appreciable quantity.

15. In combination with the generator; cooling unit, and refrigeration space of intermittent absorption refrigeration apparatus, the cooling unit including a receiver insulated from said space and a diffusing element communicating with the receiver and arranged in heat exchanging relation to the refrigeration space; heating means for the generator, a thermostat subjected to the temperature of the generator for rendering the heating means ineffective when said temperature attains a predetermined high value and tending to render said means effective when said temperature reaches a predetermined low value, a pressure actuated device operable to permit said heating means to be rendered effective, thermo-sensitive pressure creating means in heat exchanging relation to the refrigeration space and insulated from the receiver, said pressure creating means communicating with said device and functioning under a given temperature value to create pressure to actuate said device, and a receptacle in communication with the cooling unit and arranged to shield the pressure creating means from the temperature of the refrigeration space when said receptacle contains liquid refrigerant in appreciable quantity.

LEE S. CHADWICK.
MARC RESEK.
WILBUR G. MIDNIGHT.